United States Patent
Haruta et al.

(10) Patent No.: US 8,673,414 B2
(45) Date of Patent: Mar. 18, 2014

(54) HEAT-SHRINKABLE POLYESTER FILM, PROCESS FOR PRODUCTION THEREOF, AND PACKAGE

(75) Inventors: Masayuki Haruta, Inuyama (JP); Norimi Tabota, Osaka (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 533 days.

(21) Appl. No.: 12/439,348

(22) PCT Filed: Aug. 27, 2007

(86) PCT No.: PCT/JP2007/066524
§ 371 (c)(1),
(2), (4) Date: Feb. 27, 2009

(87) PCT Pub. No.: WO2008/026530
PCT Pub. Date: Mar. 6, 2008

(65) Prior Publication Data
US 2009/0304997 A1    Dec. 10, 2009

(30) Foreign Application Priority Data

Aug. 30, 2006   (JP) ................. 2006-234090
Apr. 26, 2007   (JP) ................. 2007-116812
Aug. 22, 2007   (JP) ................. 2007-215454

(51) Int. Cl.
*B32B 3/00* (2006.01)
*B65B 53/00* (2006.01)
*B29C 55/02* (2006.01)
*C08G 63/02* (2006.01)

(52) U.S. Cl.
USPC ........... 428/34.9; 428/156; 264/164; 528/272

(58) Field of Classification Search
USPC ........... 428/34.9, 156, 220; 264/164; 528/272
See application file for complete search history.

(56) References Cited

U.S. PATENT DOCUMENTS

| | | |
|---|---|---|
| 4,059,667 A | 11/1977 | Pangonis |
| 4,582,752 A | 4/1986 | Duncan |
| 4,939,232 A | 7/1990 | Fukuda et al. |
| 4,963,418 A | 10/1990 | Isaka et al. |
| 4,996,291 A | 2/1991 | Yoshinaka et al. |
| 5,407,752 A | 4/1995 | Fukuzumi et al. |

(Continued)

FOREIGN PATENT DOCUMENTS

| | | |
|---|---|---|
| CN | 1438110 A | 8/2003 |
| EP | 1 264 680 B1 | 12/2002 |

(Continued)

OTHER PUBLICATIONS

European Patent Office, Office Action in European Patent Application 07793001.4 (Sep. 15, 2010).

(Continued)

*Primary Examiner* — Erik Kashnikow
(74) *Attorney, Agent, or Firm* — Leydig, Voit & Mayer, Ltd.

(57) ABSTRACT

The present invention provides a heat-shrinkable polyester film with very good perforation-tear property and also very high productivity. A heat-shrinkable polyester film made of a polyester resin including ethylene terephthalate as a main constituent and containing 15% by mole or more of at least one monomer capable of forming an amorphous component in the whole components of the polyester resin, which exhibits specific heat shrinkage properties and specific mechanical properties after the heat shrinkage.

11 Claims, 1 Drawing Sheet

(56) References Cited

U.S. PATENT DOCUMENTS

| | | | |
|---|---|---|---|
| 6,090,898 | A | 7/2000 | Tsunekawa et al. |
| 6,231,958 | B1 | 5/2001 | Kim et al. |
| 6,270,866 | B1 | 8/2001 | Okuda et al. |
| 6,342,281 | B2 | 1/2002 | Hayakawa et al. |
| 6,383,627 | B2 | 5/2002 | Hashimoto et al. |
| 6,413,596 | B1 | 7/2002 | Okuda et al. |
| 6,524,669 | B2 | 2/2003 | Ito et al. |
| 6,623,821 | B1 | 9/2003 | Kendig |
| 6,720,085 | B2 | 4/2004 | Ito et al. |
| 6,761,966 | B2 | 7/2004 | Ito et al. |
| 6,939,616 | B2 | 9/2005 | Hayakawa et al. |
| 6,958,178 | B2 | 10/2005 | Hayakawa et al. |
| 7,001,651 | B2 | 2/2006 | Hayakawa et al. |
| 7,008,698 | B2 | 3/2006 | Marlow et al. |
| 7,303,812 | B2 | 12/2007 | Hashimoto et al. |
| 7,344,765 | B2 | 3/2008 | Hayakawa et al. |
| 7,829,655 | B2 | 11/2010 | Endo et al. |
| 7,960,028 | B2 | 6/2011 | Inagaki et al. |
| 7,980,407 | B2 | 7/2011 | Shimada |
| 8,206,797 | B2 | 6/2012 | Haruta et al. |
| 8,232,351 | B2 | 7/2012 | Mukoyama et al. |
| 2001/0014729 | A1 | 8/2001 | Hayakawa et al. |
| 2002/0090502 | A1 | 7/2002 | Ito et al. |
| 2003/0050430 | A1 | 3/2003 | Ito et al. |
| 2003/0165671 | A1 | 9/2003 | Hashimoto et al. |
| 2003/0170427 | A1 | 9/2003 | Ito et al. |
| 2005/0196563 | A1 | 9/2005 | Ito et al. |
| 2006/0057346 | A1 | 3/2006 | Ito et al. |
| 2007/0104931 | A1 | 5/2007 | Ito et al. |
| 2009/0270584 | A1 | 10/2009 | Endo et al. |
| 2010/0093965 | A1 | 4/2010 | Yamamoto et al. |
| 2010/0100363 | A1 | 4/2010 | Kurnik |
| 2010/0247845 | A1 | 9/2010 | Haruta et al. |
| 2011/0008607 | A1 | 1/2011 | Haruta et al. |
| 2012/0043248 | A1 | 2/2012 | Haruta et al. |

FOREIGN PATENT DOCUMENTS

| | | | |
|---|---|---|---|
| EP | 1 340 609 | A2 | 9/2003 |
| EP | 2 058 357 | A1 | 5/2009 |
| EP | 2 208 609 | A1 | 7/2010 |
| JP | 63-236623 | A | 10/1988 |
| JP | 5-254015 | A | 10/1993 |
| JP | 2000-254968 | A | 9/2000 |
| JP | 2001-288283 | A | 10/2001 |
| JP | 2002-363312 | A | 12/2002 |
| JP | 2003-170498 | A | 6/2003 |
| JP | 2003-236930 | A | 8/2003 |
| JP | 2003-326658 | A | 11/2003 |
| JP | 2004-34451 | A | 2/2004 |
| JP | 2004-351734 | A | 12/2004 |
| JP | 2005-066933 | A | 3/2005 |
| JP | 2005-194466 | A | 7/2005 |
| JP | 2006-45317 | A | 2/2006 |
| JP | 2006-212926 | A | 8/2006 |
| JP | 2006-233092 | A | 9/2006 |
| JP | 2007-016120 | A | 1/2007 |
| JP | 2007-152943 | A | 6/2007 |
| WO | WO 2007/145231 | A1 | 12/2007 |
| WO | WO 2008/018528 | A1 | 2/2008 |
| WO | WO 2008/026530 | A1 | 3/2008 |

OTHER PUBLICATIONS

Japanese Patent Office, International Search Report in International Patent Application No. PCT/JP2007/066524 (Oct. 9, 2007).

Japanese Patent Office, International Written Opinion in International Patent Application No. PCT/JP2007/066524 (Oct. 9, 2007).

Japanese Patent Office, Office Action in Japanese Patent Application No. 2007-215454 (Apr. 8, 2010).

Japanese Patent Office, Office Action in Japanese Patent Application No. 2007-215454 (Oct. 12, 2010).

Japanese Patent Office, Office Action in Japanese Patent Application No. 2007-215454 (Jan. 25, 2011).

Mukoyama, Yokinobu, of Tsuruga Center, Toyobo Co., Ltd., "Experiment Report" (Jun. 30, 2010) with respect to Office Action dated Apr. 8, 2010 in Japanese Patent Application No. 2007-215454.

European Patent Office, Extended European Search Report in European Patent Application No. 08833952.8 (Feb. 2, 2012).

European Patent Office, Extended European Search Report in European Patent Application No. 09714855 (Mar. 26, 2012).

Japanese Patent Office, Notice of Reasons for Rejection in Japanese Patent Application No. JP 2007-246701 (Apr. 13, 2010).

Japanese Patent Office, International Search Report in International Patent Application No. PCT/JP2008/067144 (Dec. 16, 2008).

Japanese Patent Office, Written Opinion in International Patent Application No. PCT/JP2008/067144 (Dec. 16, 2008).

Japanese Patent Office, International Search Report in International Patent Application No. PCT/JP2009/053234 (Jun. 2, 2009).

Japanese Patent Office, International Written Opinion in International Patent Application No. PCT/JP2009/053234 (Jun. 2, 2009).

European Patent Office, Communication Pursuant to Article 94(3) EPC in European Patent Application No. 08 833 952.8 (Jan. 29, 2013).

Taiwan Patent Office, Notification for the Opinion of Examination in Taiwan Patent Application No. 096131968 (Apr. 10, 2013).

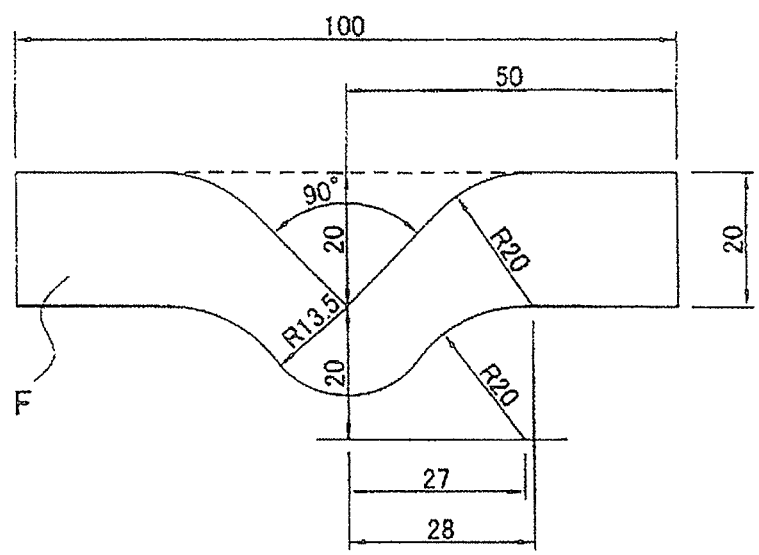

HEAT-SHRINKABLE POLYESTER FILM, PROCESS FOR PRODUCTION THEREOF, AND PACKAGE

TECHNICAL FIELD

The present invention relates to a heat-shrinkable polyester film, a process for production thereof, and package, specifically relates to a heat-shrinkable polyester film suitable for a label application, a process for production thereof, and package using the label.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

Further, as a heat-shrinkable film, a film is generally utilized which greatly shrinks in the width direction in terms of handleability in label production. Hence, the conventional heat-shrinkable polyester film has been produced by drawing at a high ratio in the width direction in order to exhibit a sufficient shrinkage force in the width direction at heating.

However, regarding the conventional heat-shrinkable polyester film, since almost no drawing is carried out in the longitudinal direction orthogonal to the main shrinkage direction, the mechanical strength is low, in the case where it is shrunk and coated on a PET bottle or the like as a label, there is a defect that a label cannot be torn well along perforations (namely, poor perforation-tear property). Further, when a film is drawn in the longitudinal direction in production in order to improve perforation-tear property of the heat-shrinkable polyester film, the mechanical strength becomes high, and perforation-tear property are improved to some extent, however, shrinkage force is exhibited in the longitudinal direction, thus when it is shrunk and coated on a PET bottle or the like as a label, a defect in which visual quality (shrinkage finish properties) becomes very bad is exposed.

Therefore, in order to improve perforation-tear property of the heat-shrinkable polyester film, a method in which an incompatible thermoplastic resin is mixed in the main raw material of the heat-shrinkable polyester film is proposed (Patent document 1).

Patent document 1: Japanese Unexamined Patent Publication No. 2002-363312

DISCLOSURE OF THE INVENTION

Problem to be Solved by the Invention

According to the method in which an incompatible thermoplastic resin is mixed in the main raw material of the heat-shrinkable polyester film like the above-described Patent document 1, although the perforation-tear property of the heat-shrinkable polyester film are improved to some extent, it cannot be necessarily said to obtain a heat-shrinkable polyester film with sufficient perforation-tear property. Further, even in the case of adopting a method like the Patent document 1, since drawing can be carried out only in the width direction in production, it is not possible to produce a heat-shrinkable polyester film efficiently.

An object of the present invention is to solve the problems that the conventional heat-shrinkable polyester film has, and provide a heat-shrinkable polyester film with very good perforation-tear property and also very high productivity.

Means for Solving the Problem

Of the present inventions, the first invention is a heat-shrinkable polyester film made of a polyester resin comprising ethylene terephthalate as a main constituent and containing 15% by mole or more of at least one monomer capable of forming an amorphous component in the whole components of the polyester resin, satisfying the following requirements (1) to (4):

(1) hot-water heat shrinkage in the width direction (direction orthogonal to the longitudinal direction) is 40% or more and 80% or less when being treated in hot water at 90° C. for 10 seconds;

(2) hot-water heat shrinkage percentage in the longitudinal direction is 0% or more and 15% or less when being treated in hot water at 90° C. for 10 seconds;

(3) right-angled tearing strength per unit thickness in the longitudinal direction is 90 N/mm or more and 280 N/mm or less after being shrunk by 10% in the width direction in hot water at 80° C.; and (4) tensile breaking strength in the longitudinal direction is 130 MPa or more and 300 MPa or less.

The second invention is an invention described in the first invention, wherein an Elmendorf ratio is 0.3 or more and 1.5 or less when Elmendorf tearing loads in the width direction and the longitudinal direction are measured after being shrunk by 10% in the width direction in hot water at 80° C.

The third invention is an invention described in the first or the second invention, wherein shrinkage stress in the width direction is 3 MPa or more and 20 MPa or less when heated at 90° C.

The fourth invention is an invention described in any one of the first to third inventions, wherein irregularity of thickness in the width direction is 1.0% or more and 10.0% or less.

The fifth invention is an invention described in any one of the first to fourth inventions, wherein the thickness is 10 μm or more and 70 μm or less, and haze is 4.0 or more and 13.0 or less.

The sixth invention is an invention described in any one of the first to fifth inventions, wherein irregularity of thickness in the longitudinal direction is 1.0% or more and 12.0% or less.

The seventh invention is an invention described in any one of the first to sixth inventions, wherein solvent adhesive strength is 2 N/15 mm width or more and 15 N/15 mm width or less.

The eighth invention is an invention described in any one of the first to seventh inventions, wherein dynamic friction coefficient is 0.1 or more and 0.55 or less.

The ninth invention is an invention described in any one of the first to eighth inventions, wherein a major component of the at least one monomer capable of forming the amorphous component in the whole components of the polyester resin is any one of neopentyl glycol, 1,4-cyclohexanedimethanol and isophthalic acid.

The tenth invention is a process for continuously producing the heat-shrinkable polyester film described in any one of the first to ninth inventions, comprising the following steps (a) to (f):

(a) a lengthwise drawing step for drawing an undrawn film 2.2 times or more and 3.0 times or less in the longitudinal direction at a temperature of Tg or more and Tg+30° C. or less followed by drawing 1.2 times or more and 1.5 times or less in the longitudinal direction at a temperature of Tg+10° C. or more and Tg+40° C. or less, thereby to be drawn lengthwisely 2.8 times or more and 4.5 times or less in total;

(b) an intermediate heat-treatment step for heat-treating the film after the longitudinal drawing at a temperature of 130° C. or more and 190° C. or less for 1.0 second or more and 9.0 seconds or less in a state that both edges in the width direction are held by clips in a tenter;

(c) a natural cooling step for naturally cooling the film after the intermediate heat-treatment by passing through an intermediate zone separated from previous and successive zones being not provided with an active heating operation;

(d) an active cooling step for actively cooling the film after the natural cooling to 80° C. or more and 120° C. or less at a surface temperature;

(e) a transverse drawing step for drawing the film after the active cooling 2.0 times or more and 6.0 times or less in the width direction at a temperature of Tg+10° C. or more and Tg+40° C. or less; and (f) a final heat-treatment step for heat-treating the film after the transverse drawing at a temperature of 80° C. or more and 100° C. or less for 1.0 second or more and 9.0 seconds or less in a state that both edges in the width direction are held by clips in a tenter.

The eleventh invention is a package, wherein the heat-shrinkable polyester film described in any one of the first to ninth inventions is used as a base material, and a label provided with perforations or a pair of notch is coated on at least a part of the outer circumference and heat-shrunk.

Effects of the Invention

The heat-shrinkable polyester film of the present invention has high shrinkability in the width direction being the main shrinkage direction, and high mechanical strength in the longitudinal direction orthogonal to the width direction, and also perforation-tear property as a label are good, so that it is possible to cut it cleanly along perforations from the start of tear in tearing until the completion of tear. Further, stiffness (so-called "bend" strength) is high, and attachability as a label is excellent. In addition, processabilities in printing and tubing are excellent. Therefore, the heat-shrinkable polyester film of the present invention can be suitably used as labels for containers such as bottles, and when used as labels, it can be attached very efficiently on containers such as bottles within a short time, and when heat-shrunk after attachment, it can exhibit good finish property almost free from wrinkle or lack of shrinkage, and the label attached exhibits very good perforation-tear property. The package of the present invention shows a good tear property of a coated label, so that it is possible to tear the coated label cleanly along perforations by a suitable force.

In addition, the heat-shrinkable polyester film of the present invention is produced by biaxial drawing lengthwisely and transversely, thus it can be produced very efficiently.

BEST MODE FOR CARRYING OUT THE INVENTION

The polyester used in the present invention is a polyester whose main constituent is ethylene terephthalate. Namely, it contains 50% by mole or more, preferably 60% by mole or more of ethylene terephthalate. Dicarboxylic acid components constituente the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage ratio.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat-shrinkable polyester film of the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C.

Further, the polyester used for the heat-shrinkable polyester film of the present invention preferably has 15% by mole or more of the sum of at least one monomer capable of forming an amorphous component in 100% by mole of the polyhydric alcohol component or in 100% by mole of the polybasic carboxylic acid component in the whole polyester resin, more preferably 17% by mole or more, and particularly preferably 20% by mole or more. Here, as a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage ratio.

Further, in the polyester used in the heat-shrinkable polyester film of the present invention, it is preferable not to contain diethylene glycol, triethylene glycol and polyethylene glycol as far as possible.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat-shrinkable polyester film of the present invention, it is preferable to make workability (slipperiness) of the polyethyleneterephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

Furthermore, it is also possible to conduct corona treatment, coating treatment, frame treatment etc. on the heat-shrinkable polyester film of the present invention in order to enhance adhesiveness of film surface.

In the heat-shrinkable polyester film of the present invention, when it is treated for 10 seconds under no-load condition in hot water at 90° C., heat shrinkage in the width direction of the film calculated from the following Equation 1 (namely, hot-water heat shrinkage at 90° C.) needs to be 40% or more and 80% or less from the lengths before and after shrinkage.

$$\text{Heat shrinkage} = \{(\text{length before shrinkage} - \text{length after shrinkage})/\text{length before shrinkage}\} \times 100\ (\%) \quad \text{Equation 1}$$

When the hot-water heat shrinkage in the width direction at 90° C. is less than 40%, since the amount of shrinkage is small, it is not preferable because wrinkle and sag generate on a label after heat shrinkage, conversely, when the hot-water heat shrinkage in the width direction at 90° C. is more than 80%, distortion in shrinkage is liable to be generated during heat shrinkage when the film is used as a label or so-called "jumping up" may be generated, and therefore the case is not preferred. Additionally, the lower limit value of the hot-water heat shrinkage in the width direction at 90° C. is preferably 45% or more, more preferably 50% or more, and particularly preferably 55% or more. The upper limit value of the hot-water heat shrinkage in the width direction at 90° C. is preferably 75% or less, more preferably 70% or less, and particularly preferably 65% or less.

Further, in the heat-shrinkable polyester film of the present invention, when it is treated for 10 seconds under no-load condition in hot water at 90° C., from the lengths before and after shrinkage, heat shrinkage in the longitudinal direction of the film calculated from the foregoing Equation 1 (namely, hot-water heat shrinkage at 90° C.) needs to be 0% or more and 15% or less, and it is preferably 0% or more and 13% or less, more preferably 0% or more and 12% or less, further preferably 0% or more and 11% or less, and particularly preferably 0% or more and 9% or less.

When the hot-water heat shrinkage in the longitudinal direction at 90° C. is less than 0% (namely, shrinkage ratio is a negative value), it is not preferable because a good shrinkage appearance cannot be obtained when used as a label of a bottle, conversely, when the hot-water heat shrinkage in the longitudinal direction at 90° C. is more than 15%, it is not preferable because strain in shrinkage at heat shrinkage tends to occur when used as a label. Additionally, the lower limit value of the hot-water heat shrinkage in the longitudinal direction at 90° C. is preferably 1% or more, more preferably 2% or more, and particularly preferably 3% or more. Further, the upper limit value of the hot-water heat shrinkage in the longitudinal direction at 90° C. is preferably 15% or less, more preferably 13% or less, and particularly preferably 11% or less.

Further, in the heat-shrinkable polyester film of the present invention, it is preferable that shrinkage stress in the width direction is 3 MPa or more and 20 MPa or less when heated at 90° C. In the case where shrinkage stress in the width direction when heated at 90° C. is less than 3 MPa, it is not preferable because a good shrinkage appearance cannot be obtained when used as a label of a bottle, conversely, in the case where shrinkage stress in the width direction when heated at 90° C. is more than 20 MPa, it is not preferable because strain in shrinkage at heat shrinkage tends to occur when used as a label. The lower limit value of the shrinkage stress in the width direction when heated at 90° C. is more preferably 4 MPa or more, further preferably 5 MPa or more, and particularly preferably 6 MPa or more. Further, the upper limit value of the shrinkage stress in the width direction when heated at 90° C. is more preferably 18 MPa or less, furthermore preferably 16 MPa or less, even more preferably 14 MPa or less, and particularly preferably 12 MPa or less.

Further, in the heat-shrinkable polyester film of the present invention, when right-angled tearing strength per unit thickness in the longitudinal direction after being shrunk by 10% in the width direction in hot water at 80° C. is obtained by the following method, the right-angled tearing strength per unit thickness in the longitudinal direction needs to be 90 N/mm or more and 280 N/mm or less.

[Measuring Method of Right-Angled Tearing Strength]

After the film is shrunk by 10% in the width direction in hot water adjusted at 80° C., it is sampled as a specimen with a predetermined size in accordance with JIS-K-7128. Thereafter, both edges of the specimen are held by a universal tensile tester and strength at tensile break in the longitudinal direction of film is measured in a condition of 200 mm/min in tensile speed. Then, right-angled tearing strength per unit thickness is calculated using the following Equation 2.

$$\text{Right-angled tearing strength} = \text{strength at tensile break}/\text{thickness} \quad \text{Equation 2}$$

When the right-angled tearing strength after being shrunk by 10% in the width direction in hot water at 80° C. is less than 90 N/mm, a situation in which the film is easily torn by an impact such as falling during transportation is possibly caused when the film is used as a label, whereby the case is unpreferred, conversely, when the right-angled tearing strength is more than 280 N/mm, it is not preferable because cutting property (easiness of tearing) become bad at an early stage of tearing a label. The lower limit value of the right-angled tearing strength is particularly preferably 120 N/mm or more. Further, the upper limit value of the right-angled tearing strength is preferably 280 N/mm or less, more preferably 250 N/mm or less, and particularly preferably 220 N/mm or less. The right-angled tearing strength can be adjusted to be further lower by producing voids in the film by increasing the amount of additives in a resin.

In the heat-shrinkable polyester film of the present invention, when Elmendorf tearing loads in the longitudinal direction and the width direction are obtained by the following method after being shrunk by 10% in the width direction in hot water at 80° C., an Elmendorf ratio being a ratio of the Elmendorf tearing loads is preferably 0.3 or more and 1.5 or less.

[Measuring Method of Elmendorf Ratio]

The film is attached on a rectangular frame having a predetermined length in a previously loosened state (namely, both edges of the film are held by the frame). Then, by immersing the film in hot water at 80° C. for about 5 seconds until the loosened film becomes a state of tension in the frame (until the sag is lost), the film is shrunk by 10% in the width direction. Thereafter, in accordance with JIS-K-7128, Elmendorf tearing loads in the width direction and the longitudinal direction are measured, and an Elmendorf ratio is calculated by the following Equation 3.

Elmendorf ratio=Elmendorf tearing load in the width direction/Elmendorf tearing load in the longitudinal direction     Equation 3

When the Elmendorf ratio is less than 0.3, it is not preferable because it is hard to tear straight through along perforations when used as a label. Conversely, when the Elmendorf ratio is more than 1.5, it is not preferable because it tends to tear at a position out of perforations. The lower limit value of Elmendorf ratio is preferably 0.4 or more, more preferably 0.5 or more, and particularly preferably 0.6 or more. Further, the upper limit value of Elmendorf ratio is preferably 1.4 or less, more preferably 1.3 or less, and particularly preferably 1.2 or less.

In the heat-shrinkable polyester film of the present invention, when tensile breaking strength in the longitudinal direction is obtained by the following method, the tensile breaking strength needs to be 130 MPa or more and 300 MPa or less.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

When the tensile breaking strength in the longitudinal direction is less than 130 MPa, it is not preferable because stiffness becomes weak when attached on a bottle etc. as a label, conversely, when the tensile breaking strength is more than 300 MPa, it is not preferable because cutting property (easiness of tearing) become bad at an early stage of tearing a label. The lower limit value of the tensile breaking strength is preferably 150 MPa or more, more preferably 170 MPa or more, and particularly preferably 190 MPa or more. The upper limit value of the tensile breaking strength is preferably 280 MPa or less, more preferably 260 MPa or less, and particularly preferably 240 MPa or less.

In the heat-shrinkable polyester film of the present invention, it is preferable that irregularity of thickness in the width direction (irregularity of thickness when measuring length is 1 m) is 10% or less. When the irregularity of thickness in the width direction is more than 10%, it is not preferable because irregularity of printing tends to occur in printing in a label production and irregularity of shrinkage tends to occur after heat shrinkage. The irregularity of thickness in the width direction is more preferably 8% or less and particularly preferably 6% or less. The smaller the irregularity of thickness in the width direction, the better, but it is considered that the lower limit of the irregularity of thickness is about 1% from performance of film forming equipment.

The thickness of the heat-shrinkable polyester film of the present invention is not particularly limited, but 5 to 200 μm is preferable as a heat-shrinkable film for a label, and 10 to 70 μm is more preferable.

In addition, the heat-shrinkable polyester film of the present invention preferably has a haze value of 4.0 or more and 13.0 or less. When the haze value exceeds 13.0, it is not preferable because transparency becomes bad, so that there is a probability that appearance becomes bad in a label production. Additionally, the haze value is more preferably 11.0 or less, and particularly preferably 9.0 or less. Further, the smaller the haze value, the better, but the lower limit is about 4.0 from considerations that a predetermined amount of a lubricant must be added to the film in order to provide slipperiness necessary for practical use or the like.

Further, in the heat-shrinkable polyester film of the present invention, it is preferable that irregularity of thickness in the longitudinal direction (irregularity of thickness when measuring length is 10 m) is 12% or less. When the irregularity of thickness in the longitudinal direction is more than 12%, it is not preferable because irregularity of printing tends to occur in printing in a label production and irregularity of shrinkage tends to occur after heat shrinkage. The irregularity of thickness in the longitudinal direction is more preferably 10% or less and particularly preferably 8% or less. Further, the smaller the irregularity of thickness in the longitudinal direction, the better, but it is considered that the lower limit of the irregularity of thickness is about 1% from performance of a film forming equipment.

Furthermore, the heat-shrinkable polyester film of the present invention preferably has solvent adhesive strength of 2 (N/15 mm) or more, and 4 (N/15 mm) or more is more preferable. When the solvent adhesive strength is less than 4 (N/15 mm), it is not preferable because it tends to peel from a solvent-bonded part after heat shrinkage of the label. The solvent adhesive strength is more preferably 6 (N/15 mm) or more, and particularly preferably 8 (N/15 mm) or more. Additionally, the higher the solvent adhesive strength, the better, but it is considered that the upper limit of the solvent adhesive strength is about 15 (N/15 mm) from performance of a film forming equipment.

In the heat-shrinkable polyester film of the present invention, it is necessary that dynamic friction coefficient (dynamic friction coefficient when the front surface and the rear surface of the heat-shrinkable polyester film are joined) is 0.1 or more and 0.55 or less. When the dynamic friction coefficient is less than 0.1, or more than 0.55, it is not preferable because processabilities in processing into a label become bad. The lower limit value of dynamic friction coefficient is more preferably 0.15 or more, and particularly preferably 0.2 or more. Further, the upper limit value of the dynamic friction coefficient is more preferably 0.50 or less, and particularly preferably 0.45 or less.

In the heat-shrinkable polyester film of the present invention, it is preferable that in differential scanning calorimetry measurement (DSC), no peak of endothermic curve in measurement of melting point is detected. By making a polyester composing a film amorphous, it becomes more difficult to exhibit a peak of endothermic curve in measurement of melting point. By making it amorphous highly to an extent that a peak of endothermic curve in measurement of melting point is not exhibited, the solvent adhesive strength is improved, and at the same time, heat shrinkage or maximum heat shrinkage stress value are enhanced, and it becomes easy to control in the forgoing preferable range.

The heat-shrinkable polyester film of the present invention can be obtained as follows; the foregoing polyester raw material is melt-extruded by an extruder to form an undrawn film, and the undrawn film is biaxially drawn by a predetermined method shown below and heat-treated.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after longitudinally drawing is quenched, and then heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming method to obtain a heat-shrinkable polyester film of the present invention is described in detail by considering the difference from the film forming method of the conventional heat-shrinkable polyester film.

[Film Forming Method of Heat-Shrinkable Polyester Film of the Present Invention]

As described above, generally, a heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable polyester film with good perforation-tear property and high productivity, and as a result, they have achieved the following knowledge.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

Then, the present inventors have reached a conclusion that in order to satisfy good perforation-tear property and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable polyester film satisfying good perforation-tear property and finish properties after shrinkage at the same time.

(1) Control of lengthwise drawing condition
(2) Intermediate heat treatment after lengthwise drawing
(3) Natural cooling (shutoff of heating) between intermediate heat treatment and transverse drawing
(4) Forced cooling of film after natural cooling
(5) Control of transverse drawing condition Hereinafter, each means described above is described sequentially.

(1) Control of Lengthwise Drawing Condition

In the process for production of a film of the present invention by a lengthwise-transverse drawing method, it is preferable to conduct the lengthwise drawing in two steps for obtaining a film roll of the present invention. Namely, a substantially unoriented film is lengthwisely drawn (first drawing step) 2.2 times or more and 3.0 times or less at a temperature of Tg or more and Tg+30° C. or less, and then without cooling below Tg lengthwisely drawn 1.2 times or more and 1.5 times or less at a temperature of Tg+10° C. or more and Tg+40° C. or less (second drawing step), thereby preferably to be lengthwisely drawn 2.8 times or more and 4.5 times or less in the total lengthwise drawing ratio (namely, lengthwise drawing ratio in the first step×lengthwise drawing ratio in the second step), more preferably to be lengthwisely drawn 3.0 times or more and 4.3 times or less in the total lengthwise drawing ratio.

Further, in conducting lengthwise drawing in two steps as described above, it is preferable to control conditions of lengthwise drawing so that a refractive index in the longitudinal direction of the film after lengthwise drawing is in a range of 1.600 to 1.630, and heat shrinkage stress in the longitudinal direction of the film after lengthwise drawing is 10 MPa or less. By conducting the lengthwise drawing in such predetermined conditions, it becomes possible to control degree of orientation in the longitudinal and width directions of the film and degree of tension of molecule in the following intermediate heat treatment, transverse drawing and final heat treatment, from which perforation-tear property of the final film can be made good.

In conducting the lengthwise drawing as described above, when the total lengthwise drawing ratio becomes high, shrinkage ratio in the longitudinal direction tends to become high, but by drawing in the lengthwise direction in two steps as described above, it becomes possible to reduce drawing stress in the longitudinal direction, and to suppress shrinkage ratio in the longitudinal direction at a low level. Further, when the total lengthwise drawing ratio becomes high, stress in drawing in the width direction becomes high, there is a tendency that control of final shrinkage ratio in the transverse direction becomes difficult, but by drawing in two steps, it becomes possible to make drawing stress in the transverse direction small, and it becomes easy to control the shrinkage ratio in the transverse direction.

Furthermore, when the total lengthwise drawing ratio becomes high, right-angled tearing strength becomes low, and tensile strength in the longitudinal direction becomes high. Further, by approximating the total lengthwise drawing ratio to the transverse drawing ratio, the Elmendorf ratio can be approximated to 1.0, so that perforation-tear property can be made good as a label. Furthermore, by drawing in the lengthwise direction in two steps, due to being capable of lowering drawing stress in the transverse direction, it becomes possible to increase the orientation of longitudinal direction, so that right-angled tearing strength becomes further low, and tensile strength in the longitudinal direction becomes larger. Therefore, by drawing in the lengthwise direction in two steps and increasing the total lengthwise drawing ratio, it becomes possible to obtain a label with very good perforation-tear property.

On the other hand, when the total lengthwise drawing ratio exceeds 4.5 times, orientation in the longitudinal direction becomes high, and solvent adhesive strength becomes low, but by controlling the total lengthwise drawing ratio to be 4.5 times or less, it becomes possible to suppress the orientation in the longitudinal direction and keep solvent adhesive strength high. Further, when the total lengthwise drawing ratio exceeds 4.5 times, roughness of surface layer becomes small, so that dynamic friction coefficient becomes high, but by controlling the total lengthwise drawing ratio to be 4.5 times or less, it becomes possible to suppress a decrease in roughness of surface layer and keep dynamic friction coefficient low.

Further, by drawing in the lengthwise direction in two steps, drawing stress in the longitudinal direction becomes small, so that there is a tendency that irregularity of thickness in the longitudinal direction and irregularity of thickness in the width direction become large, but by increasing the total lengthwise drawing ratio, it is possible to reduce irregularity of thickness in the longitudinal direction, being accompanied by that, haze can also be reduced. In addition, by increasing the total lengthwise drawing ratio, it is possible to reduce irregularity of thickness in the width direction because stress in transverse drawing becomes high.

In addition, by increasing the total lengthwise drawing ratio, it is possible to increase orientation in the longitudinal direction, thus it is possible to improve slitting property in winding a film after biaxial drawing finally into a roll.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

Namely, in the production of the film of the present invention by a lengthwise-transverse drawing method, after an undrawn film is lengthwisely drawn, under a state that both edges in the width direction are held by clips in a tenter, it is necessary to conduct heat treatment (hereinafter called intermediate heat treatment) at a temperature of 130° C. or more and 190° C. or less for 1.0 second or more and 9.0 seconds or less. By conducting such intermediate heat treatment, it becomes possible that "molecules not contributed to shrinkage force while being oriented in the longitudinal direction" can be present in a film, from which it becomes possible to obtain a film in which perforation-tear property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following predetermined natural cooling, forced cooling and transverse drawing, it becomes possible to orient molecules to the width direction and exhibit shrinkage force in the width direction while maintaining "molecules not contributed to shrinkage force while being oriented in the longitudinal direction."

The lower limit of the temperature in intermediate heat treatment is preferably 140° C. or more, and more preferably 150° C. or more. Further, the upper limit of the temperature in intermediate heat treatment is preferably 180° C. or less, and more preferably 170° C. or less. On the other hand, the time of intermediate heat treatment needs to be suitably adjusted in a range of 1.0 second or more and 9.0 seconds or less according to the composition of raw materials, and it is preferably adjusted in 3.0 seconds or more and 7.0 seconds or less.

Further, in conducting the intermediate heat treatment as described above, it is preferable to adjust conditions of intermediate heat treatment such that a refractive index in the longitudinal direction of the film after intermediate heat treatment is in a range of 1.595 to 1.625, and heat shrinkage stress in the longitudinal direction of the film after intermediate heat treatment is 0.5 MPa or less. Furthermore, it is preferable to adjust conditions of intermediate heat treatment such that tensile breaking elongation in the longitudinal direction of the film after intermediate heat treatment is 100% or more and 170% or less. By conducting the intermediate heat treatment in such a predetermined condition, it becomes possible to control degree of orientation in the longitudinal and width directions of the film and degree of tension of molecule in transverse drawing and final heat treatment, from which perforation-tear property of the final film can be made good.

When tensile breaking elongation in the longitudinal direction of the film after intermediate heat treatment is less than 100%, since the film is brittle, a transverse drawing characteristic is bad, and breakage tends to occur in transverse drawing. Conversely, when tensile breaking elongation in the longitudinal direction of the film after intermediate heat treatment is more than 170%, even by adjusting conditions of transverse drawing and final heat treatment, it becomes difficult to obtain a film with good perforation-tear property.

Furthermore, conducting the intermediate heat treatment as described above, it is preferable to adjust conditions of intermediate heat treatment such that right-angled tearing strength in the longitudinal direction of the film after intermediate heat treatment is 260 N/mm or less. By conducting the intermediate heat treatment in such a predetermined condition, it becomes possible to suppress a sharp increase of right-angled tearing strength in the longitudinal direction in transverse drawing, and it becomes possible to make perforation-tear property of the final film good.

As described above, by maintaining the treatment temperature at 130° C. or more in conducting the intermediate heat treatment, it becomes possible to reduce shrinkage force to the longitudinal direction, so that it becomes possible to greatly reduce shrinkage ratio in the longitudinal direction. Further, when the temperature of intermediate heat treatment is set to 190° C. or more, irregularity of shrinkage ratio in the transverse direction becomes large, but by controlling the treatment temperature of intermediate heat treatment at 190° C. or less, it becomes possible to reduce the irregularity of shrinkage ratio in the transverse direction.

Further, by maintaining the treatment temperature at 130° C. or more, it becomes possible to increase orientation in the longitudinal direction, so that it becomes possible to keep right-angled tearing strength low and also approximate the Elmendorf ratio to 1.0. Further, when the treatment temperature exceeds 190° C. in conducting the intermediate heat treatment, a film crystallizes, and tensile strength in the longitudinal direction deteriorates, but by controlling the temperature of intermediate heat treatment at 190° C. or less, it becomes possible to suppress crystallization of a film and keep tensile strength in the longitudinal direction high.

Further, when the treatment temperature exceeds 190° C. in conducting the intermediate heat treatment, the surface layer of the film crystallizes, and solvent adhesive strength becomes low, but by controlling the temperature of intermediate heat treatment at 190° C. or less, it becomes possible to suppress crystallization of the surface layer of the film and keep solvent adhesive strength high. In addition, by controlling the treatment temperature at 130° C. or more, it becomes possible to lower a friction coefficient by increasing the surface roughness of the surface layer suitably.

Furthermore, when the treatment temperature exceeds 190° C. in conducting the intermediate heat treatment, there is a tendency that irregularity of thickness in the longitudinal and irregularity of thickness in the width directions become large because irregularity of shrinkage generates in the film, but by controlling the temperature of intermediate heat treatment at 190° C. or less, it becomes possible to keep irregularity of thickness in the longitudinal direction low. In addition, when the treatment temperature exceeds 190° C. in conducting the intermediate heat treatment, the film crystallizes and there is a tendency that irregularity of thickness in the width direction becomes large due to variation of stress in transverse drawing, but by controlling the temperature of intermediate heat treatment at 190° C. or less, it becomes possible to suppress crystallization of the film and keep irregularity of thickness in the width direction low.

Further, when the treatment temperature exceeds 190° C. in conducting the intermediate heat treatment, slitting property of the film deteriorate in production or breakage of the film tends to occur due to generation of irregularity of shrinkage in the film, but by controlling the temperature of intermediate heat treatment at 190° C. or less, it becomes possible to suppress breakage of the film, and maintain good slitting property.

In addition, when the treatment temperature exceeds 190° C. in conducting the intermediate heat treatment, there is a tendency that haze of the film becomes high due to crystallization of the film, but by controlling the temperature of intermediate heat treatment at 190° C. or less, it becomes possible to suppress haze of the film low.

(3) Natural Cooling (Shutoff of Heating) Between Intermediate Heat Treatment and Transverse Drawing In production of a film by the lengthwise-transverse drawing method of the present invention, as described above, it is necessary to conduct intermediate heat treatment after lengthwise drawing, however, between intermediate heat treatment and transverse drawing, the film needs to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage ratio in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method of the present invention, as described above, the film naturally cooled is not transversely drawn as it is, but it is necessary that a temperature of the film is quenched to be 80° C. or more and 120° C. or less. By conducting such quenching treatment, it becomes possible to obtain a film with good perforation-tear property as a label. The lower limit of the temperature of the film after quenching is preferably 85° C. or more, and more preferably 90° C. or more. Further, the upper limit of the temperature of the film after quenching is preferably 115° C. or less, and more preferably 110° C. or less.

As described above, in quenching a film, when the temperature of the film after quenching keeps exceeding 120° C., shrinkage ratio in the width direction of the film becomes low and shrinkage becomes insufficient as a label, but by controlling the temperature of the film after quenching at 120° C. or less, it becomes possible to maintain shrinkage ratio in the width direction of the film high.

Further, in quenching a film, when the temperature of the film after quenching keeps exceeding 120° C., there is a tendency that the film crystallizes and haze becomes high, tensile strength in the longitudinal direction is lowered and solvent adhesive strength is lowered, but by quenching a temperature of the film after cooling to be 120° C. or less, it becomes possible to keep haze low, and maintain tensile strength in the longitudinal direction and solvent adhesive strength high.

Further, in quenching a film, when the temperature of the film after keeps continues exceeding 120° C., stress of transverse drawing carried out after cooling becomes small, and irregularity of thickness in the width direction tends to become large, but by quenching a temperature of the film after cooling to be 120° C. or less, it becomes possible to increase the stress of transverse drawing carried out after cooling and to reduce the irregularity of thickness in the width direction.

In addition, in quenching a film, when the temperature of the film after quenching keeps exceeding 120° C., breakage of the film tends to occur due to crystallization of the film, but by quenching a temperature of the film after cooling to be 120° C. or less, it becomes possible to suppress the breakage of the film.

(5) Control of Transverse Drawing Condition

In production of a film by the lengthwise-transverse drawing method of the present invention, it is necessary to transversely drawing a film in a predetermined condition after lengthwise drawing, intermediate heat treatment and quenching. Namely, the transverse drawing needs to be carried out such that the ratio becomes 2.0 times or more and 6.0 times or less at a temperature of Tg+10° C. or more and Tg+40° C. or less, for example, 80° C. or more and 120° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment. The lower limit of the temperature of transverse drawing is preferably 85° C. or more, and more preferably 90° C. or more. The upper limit of the temperature of transverse drawing is preferably 115° C. or less, and more preferably 110° C. or less. On the other hand, the lower limit of transverse drawing ratio is preferably 2.5 times or more, and more preferably 3.0 times or more. Further, the upper limit of transverse drawing ratio is preferably 5.5 times or less, and more preferably 5.0 times or less.

As described above, in drawing in the transverse direction, when drawing temperature is increased, tensile strength in the longitudinal direction becomes large, and the Elmendorf ratio is approximated to 1.0, right-angled tearing strength is lowered, and perforation-tear property as a label become good.

Further, when drawing temperature exceeds 120° C., shrinkage ratio in the longitudinal direction and also shrinkage ratio in the width direction become low, but by controlling the drawing temperature at 120° C. or less, it becomes possible to suppress the shrinkage ratio in the longitudinal direction low and maintain the shrinkage ratio in the width direction high.

Furthermore, when drawing temperature in the transverse direction becomes high, orientation in the transverse direction becomes low, solvent adhesive strength becomes high and also it becomes possible to prevent pressure-crash of lubricant and keep a friction coefficient low. In addition, when drawing temperature in the transverse direction becomes high, haze of the film becomes low due to decrease of voids inside the film.

Further, when drawing temperature exceeds 120° C., there is a tendency that irregularity of thickness in the width direction becomes large, but by controlling the drawing temperature at 120° C. or less, it becomes possible to reduce the irregularity of thickness in the width direction.

On the other hand, when drawing temperature is less than 80° C., orientation in the width direction becomes too high, breakage tends to occur in transverse drawing, slitting property in winding a film after biaxial drawing finally into a roll become bad, but by controlling the drawing temperature at 80° C. or more, it becomes possible to reduce the breakage in transverse drawing and improve slitting property in winding a film.

[Influence of Interaction in Production Process on Film Properties]

In production of a heat-shrinkable polyester film of the present invention, any one process of the lengthwise drawing step, the intermediate heat treatment step, the natural cooling step, the forced cooling step and the transverse drawing step cannot make film properties good, but it is considered that by conducting all of the lengthwise drawing step, the intermediate heat treatment step, the natural cooling step, the forced cooling step and the transverse drawing step in predetermined conditions, it becomes possible to make film properties very efficiently good. Further, among the film properties, the important properties such as Elmendorf ratio, right-angled tearing strength in the longitudinal direction, tensile breaking strength in the longitudinal direction, irregularity of thickness in the width direction, dynamic friction coefficient and irregularity of thickness in the longitudinal direction greatly vary in the values depending on interactions of a plurality of specific steps each other.

Namely, in the heat-shrinkable polyester film of the present invention, right-angled tearing strength in the longitudinal direction needs to be adjusted to 90 N/mm or more and 280 N/mm or less, and right-angled tearing strength in the longitudinal direction is preferably adjusted to 120 N/mm or more., and further preferably to 120 N/mm or more and 280 N/mm or less, and the Elmendorf ratio is adjusted to 0.3 or more and 1.5 or less. Interaction between lengthwise drawing step and intermediate heat treatment step has very greatly influence on the Elmendorf ratio and right-angled tearing strength in the longitudinal direction. Further, as described above, when the amount of additives in a resin is increased to make voids, it is possible to adjust the right-angled tearing strength in the longitudinal direction low.

Further, in the heat-shrinkable polyester film of the present invention, tensile breaking strength in the longitudinal direction needs to be adjusted to 130 MPa or more and 300 MPa or less, and on the tensile breaking strength in the longitudinal direction, interaction of three steps of the lengthwise drawing step, the intermediate heat treatment step and the transverse drawing step has influence very largely.

Furthermore, in the heat-shrinkable polyester film of the present invention, irregularity of thickness in the width direction is preferably adjusted to 1.0% or more and 10.0% or less, and on the irregularity of thickness in the width direction, interaction of three steps of the lengthwise drawing step, the intermediate heat treatment step and the transverse drawing step has influence very largely.

In the heat-shrinkable polyester film of the present invention, dynamic friction coefficient is preferably adjusted to 0.1 or more and 0.55 or less, and on the dynamic friction coefficient, interaction between the lengthwise drawing step and intermediate heat treatment step has influence very largely.

Further, in the heat-shrinkable polyester film of the present invention, irregularity of thickness in the longitudinal direction is preferably adjusted to 1.0% or more and 12.0% or less. Interaction between the longitudinal drawing step and intermediate heat treatment step has influence very largely on the irregularity of thickness in the longitudinal direction.

Therefore, in order to adjust the Elmendorf ratio, right-angled tearing strength in the longitudinal direction, tensile breaking strength, irregularity of thickness in the width direction, dynamic friction coefficient and irregularity of thickness in the longitudinal direction of the heat-shrinkable polyester film into the range of the present invention, while considering the above-described interaction of steps each other, delicate adjustment of conditions such as the above-described (1) to (5) is required.

The package of the present invention is a package in which a label provided with perforations using the foregoing heat-shrinkable polyester film as a base material is coated at least on a part of the outer circumference and heat-shrunk, and as an object of the package, to start with PET bottles for beverage, various kinds of bottles and cans, plastic containers for confectionary or lunch bag etc., paper box and the like can be listed (hereinafter, these are collectively referred to as a packaging object). In general, in the case where a label using a heat-shrinkable polyester film as a base material is coated on the packaging object and heat-shrunk, the label is heat-shrunk by about 2 to 15% and closely attached on the package. Additionally, a label coated on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention is described in more detail by Examples, but the present invention is by no means limited to aspects of the Examples, and it can be suitably modified in the range not departing from the scope of the present invention.

Evaluation methods of films are as follows.

[Heat Shrinkage (Hot-Water Heat Shrinkage)]

A film was cut into a square of 10 cm×10 cm, treated and heat-shrunk in no load state for 10 seconds in hot water at a predetermined temperature ±0.5° C., and then the dimensions of the film in the lengthwise and transverse directions were measured, and heat shrinkage each was obtained according to the following Equation 1. The direction with the larger heat shrinkage was defined as a main shrinkage direction.

$$\text{Heat shrinkage} = \{(\text{length before shrinkage} - \text{length after shrinkage})/\text{length before shrinkage}\} \times 100 \text{ (\%)} \quad \text{Equation 1}$$

[Maximum Value of Heat Shrinkage Stress]

A drawn film was cut into a size of a main shrinkage direction (width direction)×a direction orthogonal to the main shrinkage direction (longitudinal direction)=200 mm×15 mm. Thereafter, after a universal tensile tester STM-50 manufactured by Baldwin Corporation was adjusted to a temperature of 90° C., the cut film was set thereto, and a stress value in the main shrinkage direction when held for 10 seconds was measured.

[Right-Angled Tearing Strength]

After a film was shrunk by 10% in the main shrinkage direction in hot water adjusted at 80° C., in accordance with JIS-K-7128, a specimen was produced by sampling in a shape shown in FIG. 1 (additionally, in sampling, longitudinal direction of the specimen was defined as the main shrinkage direction). Thereafter, both edges of the specimen were held by a universal tensile tester (autograph manufactured by Shimadzu Corporation), the specimen was measured for strength at tensile break in a condition of tensile speed 200 mm/min, and the right-angled tearing strength per unit thickness was calculated using the following Equation 2.

$$\text{Right-angled tearing strength} = \text{strength at tensile break}/\text{thickness} \quad \text{Equation 2}$$

[Elmendorf Ratio]

The obtained film was attached on a rectangular frame in a previously loosened state (both edges of the film are held by the frame), by immersing the film in hot water at 80° C. for about 5 seconds until the loosened film becomes a state of tension in the frame (until the sag is lost), the film was shrunk by 10% in the main shrinkage direction of the film (hereinafter called pre-shrinkage). Thereafter, in accordance with JIS-K-7128, the film was cut into a size of main shrinkage direction×orthogonal direction=75 mm ×63 mm, a specimen was produced by providing a slit (cut) of 20 mm from the center of long edge (edge along the main shrinkage direction) to become orthogonal to this edge . Then, using the specimen produced, measurement of an Elmendorf tearing load in the orthogonal direction was carried out. Further, in the same way as in the above-described method, after pre-shrinkage of a film in the main shrinkage direction, a specimen was produced by changing the main shrinkage direction of the film into the orthogonal direction, measurement of the Elmendorf tearing load in the main shrinkage direction was carried out. Then, from the thus obtained Elmendorf tearing loads in the main shrinkage direction and the direction orthogonal to the main shrinkage direction, an Elmendorf tearing ratio was calculated using the following Equation 3.

$$\text{Elmendorf ratio} = \text{Elmendorf tearing load in the width direction}/\text{Elmendorf tearing load in the longitudinal direction} \quad \text{Equation 3}$$

[Tensile Breaking Strength]

In accordance with JIS-K-7113, a rectangular specimen with a predetermined size was produced, both edges were held by a universal tensile tester, and a tensile test was carried out in a condition of tensile speed 200 mm/min, and strength (stress) at tensile break in the longitudinal direction was calculated as the tensile breaking strength.

[Irregularity of Thickness in Width Direction]

A film was sampled to a wide strip shape of 40 mm length× 1.2 m width, and by using a continuous contact thickness indicator manufactured by Micron Measurement Device Co., Ltd., thickness was continuously measured at a speed of 5 (m/min) along the width direction of the film sample (measuring length of 500 mm). At measurement, the maximum thickness, the minimum thickness and the average thickness were defined as Tmax., Tmin. and Tave., respectively, and the irregularity of thickness of the film in the width direction was calculated from the following Equation 4.

$$\text{Irregularity of thickness} = \{(T\text{max.} - T\text{min.})/T\text{ave.}\} \times 100 \text{ (\%)} \quad \text{Formula 4}$$

[Haze]

In accordance with JIS-K-7136, haze was measured by using a haze meter (300A, manufactured by Nippon Denshoku Industries Co., Ltd.). The measurement was carried out twice and the average was obtained.

[Irregularity of Thickness in Longitudinal Direction]

A film was sampled in a long roll of 12 m length×40 mm width, and by using a continuous contact thickness indicator manufactured by Micron Measurement Device Co., Ltd, thickness was continuously measured at a speed of 5 (m/min) along the longitudinal direction of the film sample (measuring length of 10 m). At measurement, the maximum thickness, the minimum thickness and the average thickness were written as Tmax., Tmin. and Tave., respectively, and the irregularity of thickness of the film in the longitudinal direction was calculated from the above-described Equation 4.

[Solvent Adhesive Strength]

1,3-Dioxolan was applied on a drawn film, and two pieces were bonded to seal. Thereafter, the seal part was cut into a width of 15 mm in the direction orthogonal to the main shrinkage direction of the film (hereinafter called orthogonal direction), which was set to a universal tensile tester STM-50 manufactured by Baldwin Corporation, and a 180° peel test was carried out in a condition of tensile speed 200 mm/min. Then, the tensile strength at that time was defined as the solvent adhesive strength.

[Dynamic Friction Coefficient]

In accordance with JIS-K-7125, dynamic friction coefficient μd was obtained when the front surface and the rear surface of the film were contacted under an atmosphere at 23° C. and 65% RH using a tensile tester (Tensilon manufactured by ORIENTEC Co., Ltd.). The weight of a thread (weight) in which the upper side film was wound was 1.5 kg, and the base area of the thread was 63 mm lengthwise×63 mm transverse. Further, the tensile speed in the measurement of friction was 200 mm/min.

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind the inflection point of the endothermic curve, and the intersection was defined as Tg (glass transition point).

[Tm (Melting Point)]

Using a differential scanning calorimeter manufactured by Seiko Instruments Inc. (model: DSC220), 5 mg of an undrawn film was sampled, and Tm was obtained from a peak temperature in the endothermic curve when temperature was raised at a heating-up speed of 10° C./min from room temperature.

[Shrinkage Finish Property]

On a heat-shrinkable film, a three color-printing with green, gold and white ink of Toyo Ink Mfg Co., Ltd. was provided previously. By bonding both end parts of the printed film with dioxolan, a cylindrical-form label (label in which main shrinkage direction of the heat-shrinkable film was the circumferential direction) was produced. Thereafter, using a steam tunnel manufactured by Fuji Astec, Inc. (model: SH-1500-L), the label was attached by heat shrinkage on a PET bottle of 500 ml (trunk diameter 62 mm, minimum diameter of neck part 25 mm) at a zone temperature of 80° C. with a passing time of 2.5 seconds. In attachment, the neck part was adjusted such that the part of diameter 40 mm was placed on one edge of the label. The evaluation of finish property after shrinkage was carried out visually, and the criteria were as follows.

Excellent: no wrinkle, jumping up and lack of shrinkage occurs, and no irregularity of color is observed.

Good: wrinkle, jumping up or lack of shrinkage cannot be observed, but some irregularity of color is observed.

Fair: no jumping up and lack of shrinkage occurs, but irregularity of neck part is observed.

Poor: wrinkle, jumping up and lack of shrinkage occur.

[Label Adhesiveness]

A label was attached in the same condition as in the foregoing measuring condition of shrinkage finish property. Then, when the label attached and PET bottle were lightly twisted, it was "good" in the case of no movement of label, and "poor" in the case of slide or out of alignment of the label and bottle.

[Perforation-tear Property]

A label to which perforations were previously provided in the direction orthogonal to the main shrinkage direction was attached on a PET bottle in the same condition as in the foregoing measuring condition of shrinkage finish property. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly torn along the perforations in the lengthwise direction thereby to be able to remove the label from the bottle was counted, and a ratio (%) relative to the total samples of 50 was calculated.

[Refractive Index]

Using an "Abbe refractometer 4T type" manufactured by Atago Co., Ltd., a refractive index was measured after each sample film was left for two hours or more in an atmosphere at 23° C. and 65% RH.

Properties and compositions of polyester raw materials used in Examples and Comparative Examples and production conditions of films (drawing, heat treatment condition etc.) in Examples and Comparative Examples are shown in Table 1 and Table 2, respectively.

TABLE 1

| | Raw material composition of polyester (mol %) | | | | | |
| | Dicarboxylic acid component | Polyhydric alcohol component | | | | Added mount of lubricant |
| | DMT | EG | NPG | CHDM | BD | (ppm) |
|---|---|---|---|---|---|---|
| Polyester A | 100 | 100 | — | — | — | 8000 |
| Polyester A2 | 100 | 100 | — | — | — | 0 |
| Polyester B | 100 | 70 | 30 | — | — | 0 |
| Polyester C | 100 | 65 | — | 35 | — | 0 |
| Polyester D | 100 | — | — | — | 100 | 0 |

TABLE 2

| | Resin composition | Drawing condition | | | | | | |
|---|---|---|---|---|---|---|---|---|
| | | Lengthwise drawing | | | | | Intermediate heat treatment | |
| | | First drawing step | | Second drawing | | | (heat treatment after lengthwise drawing) | |
| | | Temperature (° C.) | Ratio | Temperature (° C.) | Ratio | Total ratio | Temperature (° C.) | Time (sec) |
| Example. 1 | A/A2/B/D = 5:5:80:10 | 78 | 2.6 | 95 | 1.4 | 3.64 | 160 | 5 |
| Example. 2 | A/A2/B/C/D = 5:5:15:65:10 | 78 | 2.6 | 95 | 1.4 | 3.64 | 160 | 5 |
| Example. 3 | A/A2/C/D = 5:5:80:10 | 78 | 2.6 | 95 | 1.4 | 3.64 | 160 | 5 |
| Example. 4 | A/A2/B/D = 5:5:80:10 | 78 | 2.9 | 95 | 1.4 | 4.06 | 170 | 8 |
| Example. 5 | A2/B/D = 5:70:25 | 78 | 2.3 | 95 | 1.4 | 3.22 | 155 | 5 |
| Example. 6 | A/A2/B/D = 30:5:55:10 | 78 | 2.1 | 95 | 1.4 | 2.94 | 155 | 5 |
| Example. 7 | A/A2/B/D = 5:5:80:10 | 78 | 2.1 | 95 | 1.4 | 2.94 | 155 | 5 |
| Example. 8 | A2/B/D = 5:70:25 | 78 | 2.9 | 95 | 1.4 | 4.06 | 170 | 8 |
| Comparative Example 1 | A/A2/B/D = 5:5:80:10 | 78 | 1 | 82 | 3.7 | 3.7 | 160 | 5 |
| Comparative Example 2 | A/A2/B/D = 5:5:80:10 | 78 | 2 | 92 | 1.1 | 2.2 | 150 | 5 |
| Comparative Example 3 | A/A2/B/D = 5:5:80:10 | Lengthwise drawing being not conducted | | | | | Intermediate heat treatment and cooling being not conducted | |

| | Drawing condition | | | | |
|---|---|---|---|---|---|
| | | | Transverse drawing step | | |
| | Presence or absence of intermediate zone | Temperature of cooling step | Temperature (° C.) | Ratio | Final heat treatment temperature (° C.) |
| Example. 1 | Presence | 100 | 95 | 4 | 85 |
| Example. 2 | Presence | 100 | 95 | 4 | 85 |
| Example. 3 | Presence | 100 | 95 | 4 | 85 |
| Example. 4 | Presence | 100 | 95 | 4 | 85 |
| Example. 5 | Presence | 100 | 95 | 4 | 85 |
| Example. 6 | Presence | 100 | 95 | 4 | 85 |
| Example. 7 | Presence | 100 | 95 | 4 | 85 |
| Example. 8 | Presence | 100 | 95 | 4 | 85 |
| Comparative Example 1 | Presence | 100 | 95 | 4 | 85 |
| Comparative Example 2 | Presence | 100 | 95 | 4 | 85 |
| Comparative Example 3 | Intermediate heat treatment and cooling being not conducted | | 75 | 4 | 85 |

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that glycol became 2.2 times to methyl ester in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto, polycondensation reaction was carried out at 280° C. under a reduced pressure of 26.6 Pa (0.2 torr). A polyester (A) of 0.70 dl/g in intrinsic viscosity was obtained. This polyester is polyethylene terephthalate. In the above-described production of polyester (A), $SiO_2$ (Silysia 266 manufactured by Fuji Silysia Chemical, Ltd.) was added as a lubricant at a proportion of 8,000 ppm relative to the polyester. Further, in the same way as described above, polyesters (A2, B, C, D) shown in Table 1 were synthesized. In the Table, NPG is neopentyl glycol, CHDM is 1,4-cyclohexanedimethanol, and BD is 1,4-butanediol. Regarding the intrinsic viscosity of each polyester, B was 0.72 dl/g, C was 0.80 dl/g and D was 1.15 dl/g. Each polyester was suitably made into chips.

Example 1

The above-described polyester A, polyester A2, polyester B and polyester D were mixed by 5:5:80:10 in weight ratio, and charged into an extruder. Thereafter, the mixed resin was melted at 280° C. and extruded from a T-die, and quenched by winding it on a rotating metal roll set at a surface temperature of 30° C. An undrawn film of 580 μm thickness was obtained. The taking-up speed of the undrawn film (rotary speed of metal roll) was about 20 m/min. Tg of the undrawn film was 67° C.

Then, the thus obtained undrawn film described above was introduced to a lengthwise drawing machine in which a plurality of rolls were continuously disposed, and drawn in the lengthwise direction in two steps by utilizing the difference of rotary speed of rolls. Namely, the undrawn film was preheated on a preheating roll until the film temperature became 78° C., and then drawn 2.6 times by utilizing the rotary speed difference between a low-speed rotary roll whose surface temperature was set at 78° C. and a medium-speed rotary roll whose surface temperature was set at 78° C. (first lengthwise drawing step). Furthermore, the lengthwise drawn film was lengthwisely drawn 1.4 times by utilizing the rotary speed difference between a medium-speed rotary roll whose surface temperature was set at 95° C. and a high-speed rotary roll whose surface temperature was set at 30° C. (second lengthwise drawing step) (accordingly, the total lengthwise drawing ratio was 3.64 times).

The film immediately after the lengthwise drawing as described above was forcedly cooled at a cooling speed of 40° C./sec by a cooling roll (high-speed roll positioned just behind the lengthwise drawing roll in the second step) whose surface temperature was set at 30° C., and then the film after cooling was introduced to a tenter, and continuously passed through an intermediate heat treatment zone, a first intermediate zone (natural cooling zone), a cooling zone (forced cooling zone), a second intermediate zone, a transverse drawing zone and a final heat treatment zone. In the tenter, the length of the first intermediate zone was set to about 40 cm, and shielding plates were each provided between the intermediate heat treatment zone and the first intermediate zone; between the first intermediate zone and the cooling zone; between the cooling zone and the second intermediate zone; and between the second intermediate zone and the transverse drawing zone. Furthermore, in the first intermediate zone and the second intermediate zone, hot wind from the intermediate heat treatment zone, cooling wind from the cooling zone and hot wind from the transverse drawing zone were shut off such that when a rectangular strip of paper is hung down in the vertical direction in a state that a film is not passed through, the strip of paper hangs down almost completely in the vertical direction. In addition, when a film passes through, in the boundary between the intermediate heat treatment zone and the first intermediate zone, and the boundary between the cooling zone and the second intermediate zone, the distance of the film and the shielding plate was adjusted such that the most part of associated air accompanied by movement of the film was shut off by the shielding plate.

Then, the lengthwisely drawn film introduced to the tenter was heat-treated at first in the intermediate heat treatment zone at a temperature of 160° C. for 5.0 seconds, and then the film after the intermediate heat treatment was introduced to the first intermediate zone, and subjected to natural cooling by passing it through the zone (passing time=about 1.0 second). Thereafter, the film after the natural cooling was introduced to the cooling zone, and actively cooled by blowing wind of low temperature until the surface temperature of the film became 100° C., the film after the cooling was introduced to the second intermediate zone, and subjected to natural cooling again by passing it through the zone (passing time=about 1.0 second). Further, the film after passing through the second intermediate zone was introduced to the transverse drawing zone, preheated until the surface temperature of the film became 95° C., and drawn 4.0 times in the width direction (transverse direction) at 95° C.

Thereafter, the film after the transverse drawing was introduced to the final heat treatment zone, heat-treated in the final heat treatment zone at a temperature of 85° C. for 5.0 seconds, and then cooled, both edge parts were cut and removed for winding a roll of width 500 mm. A biaxially drawn film of about 40 µm in a predetermined length was produced continuously. Then, properties of the film obtained were evaluated by the foregoing methods. The evaluation results are shown in Table 3.

Example 2

The above-described polyester A, polyester A2, polyester B, polyester C and polyester D were mixed by 5:5:15:65:10 in weight ratio, and charged into an extruder. Thereafter, the mixed resin was melted and extruded in the same condition as in Example 1 to form an undrawn film. Tg of the undrawn film was 67° C. The undrawn film was film-formed in the same condition as in Example 1. A biaxially drawn film of about 40 µm in 500 mm wide was produced continuously. Then, properties of the film obtained were evaluated by the same way as in Example 1. The evaluation results are shown in Table 3.

Example 3

The above-described polyester A, polyester A2, polyester C and polyester D were mixed by 5:5:80:10 in weight ratio, and charged into an extruder. Thereafter, the mixed resin was melted and extruded in the same condition as in Example 1. An undrawn film was obtained. Tg of the undrawn film was 67° C. The undrawn film was film-formed in the same condition as in Example 1. A biaxially drawn film of about 40 µm in 500 mm wide was produced continuously. Then, properties of the film obtained were evaluated by the same way as in Example 1. The evaluation results are shown in Table 3.

Example 4

An undrawn film was obtained in the same manner as in Example 1 except that film thickness was changed to 650 µm by adjusting the discharge rate in Example 1. A biaxially drawn film of about 40 µm in 500 mm wide was continuously produced by film-forming the undrawn film in the same condition as in Example 1 except that the lengthwise drawing ratio of the first step was 2.9 times, so that the total lengthwise drawing ratio was changed to 4.06 times, and heat treatment was conducted at 170° C. for 8.0 seconds in the intermediate heat treatment zone. Then, properties of the film obtained were evaluated by the same way as in Example 1. The evaluation results are shown in Table 3.

Example 5

The above-described polyester A2, polyester B and polyester D were mixed by 5:70:25 in weight ratio, and charged into an extruder. Thereafter, the mixed resin was melted and extruded in the same condition as in Example 1 except that the discharge amount was adjusted. An undrawn film of 510 µm in film thickness was formed. Tg of the undrawn film was 65° C. A biaxially drawn film of about 40 µm in 500 mm wide was continuously produced by film-forming the undrawn film in the same condition as in Example 1 except that the lengthwise drawing ratio of first step was 2.3 times, so that the total lengthwise drawing ratio was changed to 3.22 times, and heat treatment was conducted at 155° C. in the intermediate heat treatment zone. Then, properties of the film obtained were evaluated by the same way as in Example 1. The evaluation results are shown in Table 3.

Example 6

The above-described polyester A, polyester A2, polyester B and polyester D were mixed by 30:5:55:10 in weight ratio, and charged into an extruder. Thereafter, the mixed resin was melted and extruded in the same condition as in Example 1 except that the discharge amount was changed. An undrawn film of 470 µm in film thickness was formed. Tg of the undrawn film was 67° C. A biaxially drawn film of about 40 µm in 500 mm wide was continuously produced by film-forming the undrawn film in the same condition as in Example 1 except that the lengthwise drawing ratio of the first step was 2.1 times, so that the total lengthwise drawing ratio was changed to 2.94 times, and heat treatment was conducted at 155° C. in the intermediate heat treatment zone. Then, properties of the film obtained were evaluated by the same way as Example 1. The evaluation results are shown in Table 3.

Example 7

An undrawn film of 470 μm in film thickness was obtained in the same manner as in Example 1 except that the discharge amount was changed. Thereafter, a biaxially drawn film of about 40 μm in 500 mm wide was continuously produced by adopting the same film-forming condition as in the above-described Example 6. Then, properties of the film obtained were evaluated by the same way as in Example 1. The evaluation results are shown in Table 3.

Example 8

An undrawn film of 650 μm in film thickness was obtained by using the same polyester raw materials as in Example 5 and adjusting the discharge amount. A biaxially drawn film of about 40 μm in 500 mm wide was continuously produced by adopting the same film-forming condition as in Example 4 for the undrawn film. Then, properties of the film obtained were evaluated by the same way as in Example 1. The evaluation results are shown in Table 3.

Comparative Example 1

In melting and extruding the same polyester raw materials as in Example 1 by the same manner as in Example 1, the discharge amount of an extruder was adjusted such that a thickness of an undrawn film became 590 μm. Except that, an undrawn film was obtained in the same manner as in Example 1. Then, the undrawn film was drawn 3.7 times in one step by utilizing the rotary speed difference between a medium-speed rotary roll whose surface temperature was set at 82° C. and a high-speed rotary roll whose surface temperature was set at 30° C. Thereafter, in the same manner as in Example 1, the film was subjected to intermediate heat treatment, natural cooling, forced cooling, transverse drawing and final heat treatment, and both edge parts were cut and removed. A biaxially drawn film of about 40 μm in 500 mm wide was produced continuously. Then, properties of the film obtained were evaluated by the same way as in Example 1. The evaluation results are shown in Table 3.

Comparative Example 2

An undrawn film of 350 μm in film thickness obtained in the same manner as in Example 1 except that the discharge amount was changed was preheated on a preheating roll until the film temperature became 75° C., and drawn 2.0 times by utilizing the rotary speed difference between a low-speed rotary roll whose surface temperature was set at 78° C. and a medium-speed rotary roll whose surface temperature was set at 78° C. Furthermore, the lengthwisely drawn film was lengthwisely drawn 1.1 times by utilizing the rotary speed difference between a medium-speed rotary roll whose surface temperature was set at 92° C. and a high-speed rotary roll whose surface temperature was set at 30° C. (total lengthwise drawing ratio was 2.2 times, accordingly). Thereafter, in the same manner as in Example 1, the film was subjected to intermediate heat treatment, natural cooling, forced cooling, transverse drawing and final heat treatment, and both edge parts were cut and removed. A biaxially drawn film of about 40 μm in 500 mm wide was produced continuously. Then, properties of the film obtained were evaluated by the same way as in Example 1. The evaluation results are shown in Table 3.

Comparative Example 3

An undrawn film of 160 μm in film thickness obtained in the same manner as in Example 1 except that the discharge amount was changed was preheated on a preheating roll until the film temperature became 75° C., and subjected to transverse mono-axial drawing 4.0 times at 75° C. in the width direction (transverse direction). Thereafter, the film after the transverse drawing was introduced to a final heat treatment zone, and heat-treated at a temperature of 85° C. for 5.0 seconds in the final heat treatment zone, and cooled, and both edge parts were cut and removed for winding it in a roll of width 500 mm. A transverse mono-axial drawn film of about 40 μm in a predetermined length was produced continuously. Further, properties of the film obtained were evaluated by the same way as in Example 1. The evaluation results are shown in Table 3.

TABLE 3

| | Properties of heat-shrinkable film | | | | | | | | |
|---|---|---|---|---|---|---|---|---|---|
| | Hot-water shrinkage (%) | | Right-angled | Elmendorf tearing load (mN) | | | Tensile breaking strength (MPa) | | |
| | Main shrinkage direction | Orthogonal direction | tearing strength | Main shrinkage direction | Orthogonal direction | Elmendorf ratio | Orthogonal direction | Shrinkage stress (MPa) |
| | 80° C. | 90° C. | 90° C. | (N/mm) | | | | | |
| Example 1 | 41 | 57 | 7 | 240 | 260 | 310 | 0.84 | 220 | 10.1 |
| Example 2 | 42 | 59 | 6.5 | 240 | 260 | 310 | 0.84 | 215 | 9.8 |
| Example 3 | 40 | 60 | 6.5 | 235 | 260 | 300 | 0.87 | 210 | 9.1 |
| Example 4 | 40 | 57 | 12 | 180 | 260 | 250 | 1.04 | 270 | 9.9 |
| Example 5 | 44 | 55 | 6 | 200 | 250 | 320 | 0.78 | 150 | 8.2 |
| Example 6 | 40 | 57 | 8 | 280 | 270 | 310 | 0.87 | 280 | 18 |
| Example 7 | 40 | 56 | 7 | 270 | 260 | 360 | 0.72 | 150 | 9.5 |
| Example 8 | 44 | 55 | 12 | 160 | 250 | 230 | 1.09 | 200 | 9 |
| Comparative Example 1 | 37 | 52 | 16 | 210 | 270 | 250 | 1.08 | 240 | 10.1 |
| Comparative Example 2 | 36 | 54 | 3 | 300 | 250 | 900 | 0.28 | 160 | 8.1 |
| Comparative | 50 | 60 | 5 | 420 | 210 | 3300 | 0.06 | 70 | 8 |

TABLE 3-continued

Example 3

| | Properties of heat-shrinkable film | | | | | | | | |
|---|---|---|---|---|---|---|---|---|---|
| | Irregularity of thickness (%), | | | Solvent | | | | | |
| | Main shrinkage direction | Orthogonal direction | Haze (%) | adhesive strength (N/15 mm) | Dynamic friction coefficient | Label adhesiveness | Irregularity of shrinkage | Wrinkle on roll | Defective ratio of perforation tear (%) |
| Example 1 | 6.1 | 4.2 | 7.5 | 5.5 | 0.43 | Good | Good | Good | 8 |
| Example 2 | 7.1 | 5.2 | 7.5 | 5.9 | 0.41 | Good | Good | Good | 8 |
| Example 3 | 7.5 | 5.7 | 7.5 | 6.1 | 0.41 | Good | Good | Good | 8 |
| Example 4 | 8.9 | 7.6 | 8.5 | 4.9 | 0.43 | Good | Good | Good | 8 |
| Example 5 | 11.8 | 9.2 | 11.1 | 6.5 | 0.39 | Good | Good | Good | 10 |
| Example 6 | 6.9 | 6.4 | 12.6 | 4.1 | 0.45 | Good | Good | Good | 8 |
| Example 7 | 10.3 | 8.5 | 11.6 | 5.6 | 0.45 | Good | Good | Good | 8 |
| Example 8 | 10.4 | 9.1 | 12.5 | 4.5 | 0.42 | Good | Good | Good | 10 |
| Comparative Example 1 | 5.8 | 2.8 | 7 | 4.4 | 0.47 | Good | Fair | Good | 2 |
| Comparative Example 2 | 8.1 | 14.1 | 14 | 5.9 | 0.35 | Good | Good | Fair | 18 |
| Comparative Example 3 | 5 | 4 | 6 | 7 | 0.52 | Good | Good | Good | 40 |

As is clear from Table 3, the films obtained in Examples 1 to 8 were all high in shrinkage in the width direction being the main shrinkage direction and very low in shrinkage in the longitudinal direction orthogonal to the main shrinkage direction. Further, the films obtained in Examples 1 to 8 were all high in solvent adhesive strength and low in irregularity of thickness in the longitudinal direction, and when used as a label, good in label adhesiveness, and no irregularity of shrinkage was observed and perforation-tear property were good. Furthermore, wrinkle was not generated in the film rolls obtained in Examples 1 to 8. Namely, the heat-shrinkable polyester films obtained in Examples were all excellent in quality as a label and very good in practical utility.

In contrast thereto, the heat-shrinkable polyester film obtained in Comparative Example 1 was high in heat shrinkage in the longitudinal direction, and irregularity of shrinkage was generated when used as a label. Further, the film obtained in Comparative Example 2 was rather high in right-angled tearing strength, and perforation-tear property were bad. Besides, haze was high, irregularity of thickness in the width direction was large and wrinkle was generated in the film roll. The film obtained in Comparative Example 3 was high in right-angled tearing strength, small in tensile breaking strength in the perpendicular direction (longitudinal direction) and perforation-tear property were not good. Namely, the heat-shrinkable polyester films obtained in Comparative Examples were all inferior in quality as a label, and low in practical utility.

Industrial Applicability

The heat-shrinkable polyester film of the present invention has excellent processing properties as describe above, thus it can be used suitably as a label application for bottles.

BRIEF DESCRIPTION OF THE DRAWINGS

FIG. 1 is an explanatory drawing showing a shape of specimen in measurement of right-angled tearing strength (additionally, unit in length of each part of specimen in the figure is mm). The reference terms "R20" and "R13.5" indicate that the radius of circle at the indicated points are 20 mm and 13.5 mm, respectively.

EXPLANATION OF REFERENCE NUMERALS

F Film

The invention claimed is:

1. A heat-shrinkable polyester film made of a polyester resin comprising ethylene terephthalate as a main constituent and containing 15% by mole or more of at least one monomer capable of forming an amorphous component in the whole components of the polyester resin, wherein the film is drawn longitudinally 2.8 times or more and 4.5 times or less in total, and satisfies the following requirements (1) to (4):
  (1) hot-water heat shrinkage in the width direction is 40% or more and 80% or less when being treated in hot water at 90° C. for 10 seconds;
  (2) hot-water heat shrinkage in the longitudinal direction is 0% or more and 15% or less when being treated in hot water at 90° C. for 10 seconds;
  (3) right-angled tearing strength per unit thickness in the longitudinal direction is 90 N/mm or more and 280 N/mm or less after being shrunk by 10% in the width direction in hot water at 80° C.; and
  (4) tensile breaking strength in the longitudinal direction is 130 MPa or more and 300 MPa or less.

2. The heat-shrinkable polyester film of claim 1, wherein an Elmendorf ratio is 0.3 or more and 1.5 or less when Elmendorf tearing loads in the width direction and the longitudinal direction are measured after being shrunk by 10% in the width direction in hot water at 80° C.

3. The heat-shrinkable polyester film of claim 1, wherein shrinkage stress in the width direction is 3 MPa or more and 20 MPa or less when heated at 90° C.

4. The heat-shrinkable polyester film of claim 1, wherein irregularity of thickness in the width direction is 1.0% or more and 10.0% or less.

5. The heat-shrinkable polyester film of claim 1, wherein the thickness is 10 μm or more and 70 μm or less, and haze is 4.0 or more and 13.0 or less.

6. The heat-shrinkable polyester film of claim 1, wherein irregularity of thickness in the longitudinal direction is 1.0% or more and 12.0% or less.

7. The heat-shrinkable polyester film of claim 1, wherein solvent adhesive strength is 2 N/15 mm width or more and 15 N/15 mm width or less.

8. The heat-shrinkable polyester film of claim 1, wherein dynamic friction coefficient is 0.1 or more and 0.55 or less.

9. The heat-shrinkable polyester film of claim 1, wherein a major component of the at least one monomer capable of forming the amorphous component in the whole components of the polyester resin is any one of neopentyl glycol, 1,4-cyclohexanedimethanol and isophthalic acid.

10. A process for continuously producing of the heat-shrinkable polyester film of claim 1, comprising the following steps (a) to (f):
   (a) a longitudinal drawing step for drawing an undrawn film 2.2 times or more and 3.0 times or less in the longitudinal direction at a temperature of Tg or more and Tg+30° C. or less followed by drawing 1.2 times or more and 1.5 times or less in the longitudinal direction at a temperature of Tg+10° C. or more and Tg+40° C. or less, thereby to be drawn longitudinally 2.8 times or more and 4.5 times or less in total;
   (b) an intermediate heat-treatment step for heat-treating the film after the longitudinal drawing at a temperature of 130° C. or more and 190° C. or less for 1.0 second or more and 9.0 seconds or less in a state that both edges in the width direction are held by clips in a tenter;
   (c) a natural cooling step for naturally cooling the film after the intermediate heat-treatment by passing through an intermediate zone separated from the front and the rear zones being not provided with an active heating operation;
   (d) an active cooling step for actively cooling the film after the natural cooling to 80° C. or more and 120° C. or less at a surface temperature;
   (e) a transverse drawing step for drawing a film after the active cooling 2.0 times or more and 6.0 times or less in the width direction at a temperature of Tg+10° C. or more and Tg+40° C. or less; and
   (f) a final heat-treatment step for heat-treating a film after the transverse drawing, at a temperature of 80° C. or more and 100° C. or less for 1.0 second or more and 9.0 seconds or less in a state that both edges in the width direction are held by clips in a tenter.

11. A package, wherein the heat-shrinkable polyester film of claim 1 is used as a base material, and a label provided with perforations or a pair of notch is coated on at least a part of the outer circumference and heat-shrunk.

* * * * *